United States Patent [19]

Kubo

[11] Patent Number: 4,878,688
[45] Date of Patent: Nov. 7, 1989

[54] VEHICLE SUSPENSION SYSTEM FOR A STEERABLE WHEEL

[75] Inventor: Kanji Kubo, Saitama, Japan

[73] Assignee: Honda Giken Kogyo Kabushiki Kaisha, Tokyo, Japan

[21] Appl. No.: 169,438

[22] Filed: Mar. 17, 1988

[30] Foreign Application Priority Data

Mar. 20, 1987 [JP] Japan .............................. 62-067460

[51] Int. Cl.⁴ .............................................. B60G 3/20
[52] U.S. Cl. .................................. 280/693; 280/691; 280/666; 280/696
[58] Field of Search ............... 280/691, 696, 690, 688, 280/701, 666, 668, 693

[56] References Cited

U.S. PATENT DOCUMENTS

| | | | |
|---|---|---|---|
| 4,327,927 | 5/1982 | Tanaka et al. | 280/691 |
| 4,377,298 | 3/1983 | Finn et al. | 280/696 |
| 4,440,420 | 4/1984 | Müller | 280/691 |

FOREIGN PATENT DOCUMENTS 2172254  9/1986  United Kingdom ................ 280/691

*Primary Examiner*—Charles A. Marmor
*Assistant Examiner*—Karin Tyson
*Attorney, Agent, or Firm*—Nixon & Vanderhye

[57] ABSTRACT

A suspension system for a steerable wheel, comprising two pairs of lateral links, each pair being located one above the other, which are pivotally connected to upper and lower parts of a knuckle at their first ends, respectively, and pivotally connected to a vehicle body at their second ends, so as to allow both a steering action and a vertical motion of the knuckle which carries a wheel, wherein: the lower lateral links comprise a first lower link which extends laterally of the vehicle and a second lower link which diverges from the first lower link so as to act as a radius rod; and the upper lateral links comprise a first upper link which extends in a direction intermediate between those of the lower links as projected onto a horizontal plane and a second upper link which diverges relative to the first upper link, so as to extend obliquely in opposite direction to the second lower link. Preferably, the first end of the second upper lateral link is spaced laterally from the first end of the first upper lateral link away from the vehicle body. Thereby, the imaginary kingpin is prevented from moving in a complex manner and a favorable arrangement of a shock absorber system is made possible by connecting the lower end of the shock absorber system to the first lower link and passing the upper end thereof through the space between the upper links.

9 Claims, 4 Drawing Sheets

VEHICLE SUSPENSION SYSTEM FOR A STEERABLE WHEEL

TECHNICAL FIELD

The present invention relates to a vehicle suspension system for a steerable wheel and in particular to such a suspension system for a steerable wheel which minimizes the change in the force required to maintain a steering angle as the wheel is steered.

BACKGROUND OF THE INVENTION

In a conventional suspension system for a steerable wheel, the knuckle which rotatably supports a wheel is typically pivoted at its upper and lower points, respectively, to the free ends of, for instance, a pair of A-arms which are pivotally connected to the vehicle body at their base ends so as to allow a vertical motion and a steering action of the wheel. In such a suspension system, an imaginary kingpin can be defined as a line connecting the upper and the lower pivot points of the knuckle. The wheel is steered about this imaginary kingpin but, since the center of the tread contact surface of the wheel and the point of intersection between the imaginary kingpin and the tread contact surface generally do not coincide with each other, the so-called self aligning torque which tends to restore the wheel to a straight ahead position is normally produced.

When a manual steering system is used, this self-aligning torque is naturally transmitted to the steering wheel and gives the feel of the state of the steered wheels to the driver. Even when a power assisted steering system is used, the reaction which the wheels experience from the road is allowed to be transmitted from the steered wheels to the steering wheel so as to improve the handling of the vehicle by giving the feel of the steered wheels to the driver. In either case, this self-aligning torque is required to be controlled to a manageable level and should not increase or decrease abruptly as the steering angle is changed.

In the case of steerable rear wheels of a vehicle equipped with a four wheel steering system in which the ratio of the steering angle of the rear wheels to the steering angle of the front wheels is varied depending on the speed of the vehicle or the steering angle of the front wheels, the self-aligning torque may change in a highly complex way without offering any benefit and it is desirable to totally eliminate the self-aligning torque if possible.

When the kingpin, real or imaginary, is fixed as is the case with most of the conventional suspension systems, the self-aligning-torque can be easily eliminated by allowing the kingpin to pass through the center of the tread contact surface of the wheel but when that cannot be done because of other considerations then it is impossible to control the self-aligning torque.

On the other hand, in a suspension system of the kind disclosed in Japanese Patent Publication No. 52-9889 having two pairs of lateral links connected to upper and lower parts of the knuckle, respectively, it is possible to change the various parameters of the suspension system and favorable settings of the camber angle, the toe angle and caster angle can be obtained as desired, but, since the imaginary kingpin tends to move as the steering angle changes, the resulting change in the self-aligning torque or the force required to maintain a steering angle tends to vary a great deal or in a complicated fashion and may not be sufficiently manageable. A favorable arrangement of such lateral links is proposed in copending U.S. Pat. Application No. 135,250 by the same Inventor and assigned to the same Assignee.

However, it is not always possible to achieve the above-mentioned geometrical relationship due to the restrictions in the freedom of layout of the suspension system. Specifically, since it is generally necessary to support the wheel against a running resistance with a certain compliance, one of the lower links is required to be constructed as a radius rod which forms a relatively large angle in relation with the direction of the axle. Further, due to the fact that the lower end of the shock absorber system comprising an oil damper, a coil spring and so on is desired to be supported by one of the lower links, it is preferable if the other lower link extends along and in the proximity of the axle as projected upon a horizontal plane. Generally speaking, the instantaneous centers of rotation of the lower links and the upper links can be made to coincide with each other as projected onto a horizontal plane by arranging the upper links and the lower links in a similar layout and reducing the range of the change of the instantaneous center of rotation at the tire tread surface. However, such a layout of the upper links is not possible in this case since the upper end of the shock absorber system tends to interfere with the upper links.

BRIEF SUMMARY OF THE INVENTION

In view of such problems of the prior art, a primary object of the present invention is to provided an improved suspension system of the kind having two pairs of lateral links which are pivoted to upper and lower parts of a knuckle, which reduces the change in the force required to maintain a steering angle and yet permits a favorable arrangement of a shock absorber system.

Another object of the present invention is to provide a suspension system for a steerable wheel using four lateral links which minimizes the change in the force required to maintain a steering angle while allowing much freedom in the setting of various wheel alignment parameters.

Yet another object of the present invention is to provide a suspension system which is advantageous for use as the rear wheel suspension system of a four wheel steering vehicle.

According to the present invention, these and other objects of the present invention can be accomplished by providing a suspension system for a steerable wheel, comprising a knuckle rotatably supporting a wheel having a tire, two pairs of lateral links, each pair being located one above the other, which are pivotally connected to upper and lower parts of the knuckle at their first ends, respectively, and pivotally connected to a vehicle body at their second ends, so as to allow both a steering action and a vertical motion of the knuckle, wherein: the lower lateral links comprise a first lower link which extends substantially laterally of the vehicle with its extension line passing substantially through a point of contact between the tire and a road surface as projected onto the road surface and a second lower link which diverges relative to the first lower link from the knuckle toward the vehicle body forming a certain angle in relation with the first lower link; and the upper lateral links comprise a first upper link which extends in a direction intermediate between those of the lower links as projected onto a horizontal plane and a second upper link which diverges relative to the first upper link, so as to extend obliquely in opposite direction to the second lower link as projected onto a horizontal plane, from the knuckle toward the vehicle body forming a certain angle in relation with the first upper link; the first end of the second upper lateral link being spaced laterally from the first end of the first upper lateral link away from the vehicle body while the first ends of the lower lateral links are substantially aligned along the longitudinal direction of the vehicle and, likewise, the second ends of each pair of the lateral links are substantially aligned to each other along a longitudinal direction of the vehicle.

Thereby, the trajectory of the instantaneous center of rotation of the upper links can substantially aligned to that of the lower links as projected onto a horizontal plane so that the change in the force required to perform a steering action is minimized or is prevented from occurring in a complex manner in relation with the steering angle and, at the same time, the interference between the lateral links and the shock absorber system can be avoided. Additionally, the advantages of the suspension system using four lateral links are preserved.

According to a preferred embodiment of the present invention, a lower end of a shock absorber system is connected to an intermediate point of the first lower lateral link while an upper end of the shock absorber system is passed through a space defined between the upper lateral links.

Further, this invention is particularly significant when it is applied to a rear wheel of a vehicle equipped with a four wheel steering system. Particularly in this case, a favorable arrangement can be accomplished by disposing the first lower lateral link behind the second lower lateral link.

BRIEF DESCRIPTION OF THE DRAWINGS

Now the preferred embodiment of the present invention is described in the following with reference to the appended drawings, in which.

DETAILED DESCRIPTION OF THE PREFERRED EMBODIMENT

Figure 1:
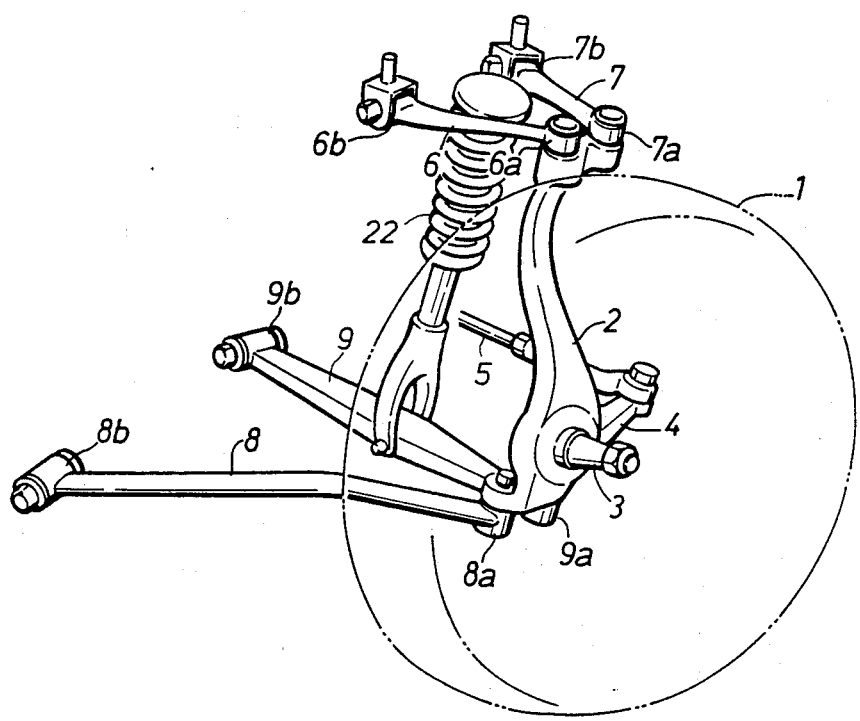
FIG. 1 is a perspective view of an embodiment of the suspension system according to the present invention.
Figure 2:
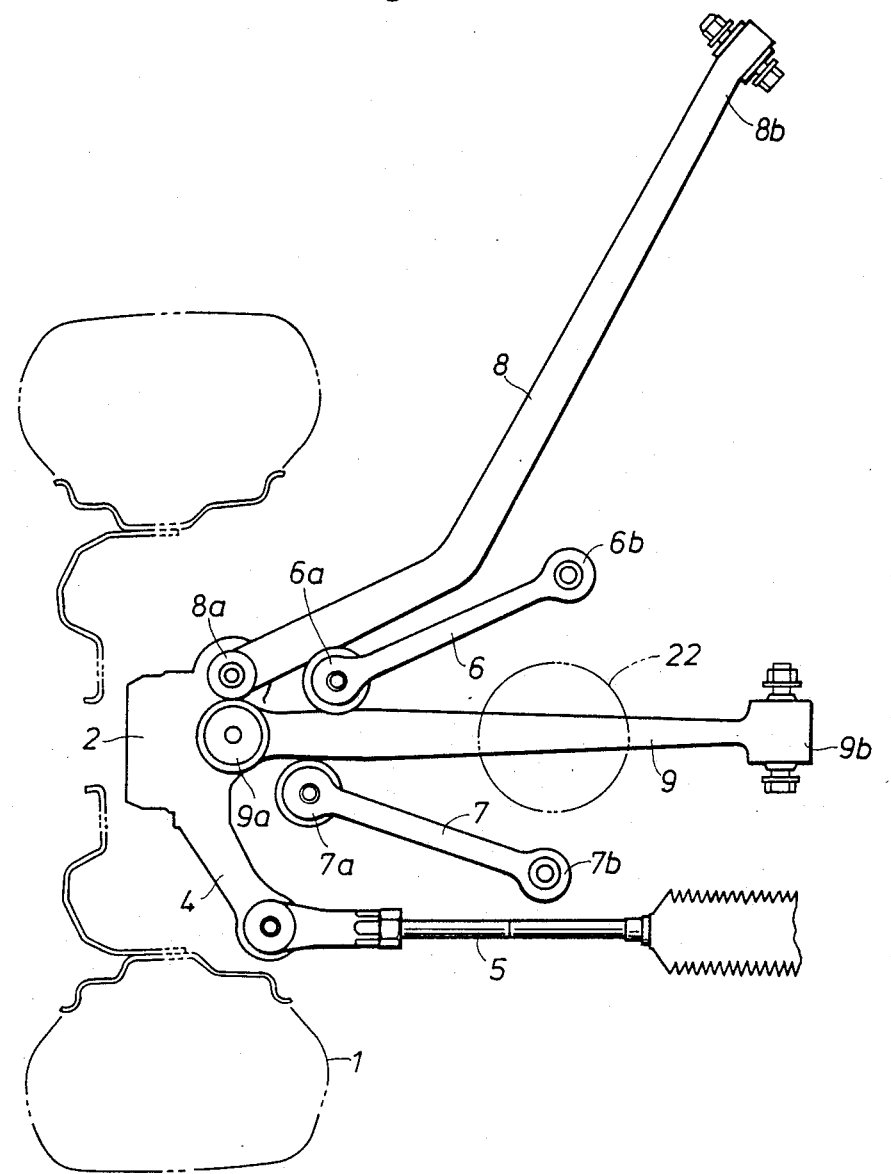
FIG. 2 is a plan view of the suspension system of FIG. 1.

FIGS. 1 and 2 show an embodiment of the suspension system for a steerable wheel according to the present invention as applied to a rear wheel of a vehicle equipped with a four wheel steering system. The wheel 1 is rotatably supported on a spindle 3 which laterally and integrally projects from a knuckle 2. A knuckle arm 4 integrally projects inwardly and rearwardly from a lower part of the knuckle 2 and the free end of the knuckle arm 4 is pivotally connected to a tie rod 5 which transmits the force for steering action.

The outer ends 6a and 7a of a pair of links 6 and 7 are connected to upper parts of the knuckle 2 which are spaced from each other along the fore-and-aft direction, by way of ball joints, while the inner ends 6b and 7b of these links 6 and 7 are likewise connected to a vehicle body not shown in the drawings by way of ball joints (or, alternatively, by way of rubber-mounted bushes as mentioned hereinafter). The outer ends 8a and 9a of another pair of links 8 and 9 are likewise connected to lower parts of the knuckle 2 by way of ball joints while the inner ends 8b and 9b of these links 8 and 9 are connected to the vehicle body by way of rubber-mounted bushes. The inner ends 8b and 9b of these links may be connected to the vehicle body by way of ball joints but the lateral angular changes of these links in relation with the vehicle body are so small that the rubber-mounted bushes can safely permit the angular changes in the links 8 and 9.

The link 9 extends substantially in the same direction as the axle while the link 8 extends obliquely forwardly of the vehicle body as a radius rod for supporting the wheel against the running resistance, which the wheel receives from the road surface, as a tension force. Additionally, the link 9 is vertically aligned with the axle.. To an intermediate location of the link 9 is connected the lower end of a shock absorber system 22 consisting of a compression coil spring and a hydraulic damper. The upper end of the shock absorber system 22 is passed through the space between the two upper lateral links 6 and 7 and is connected to a part of the vehicle body which is not shown in the drawings. Since the upper links 6 and 7 extend obliquely forwardly and rearwardly of the axle, respectively, they do not interfere with the shock absorber system 22.

Thus, the wheel 1 is supported so as to be able to travel vertically and the changes in the camber angle, the caster angle and the toe angle of the wheel 1 can be freely determined by appropriately changing the lengths of these links 6 through 9 and the locations of their pivot points. By applying an actuating force to the tie rod 5, a steering force is transmitted to the knuckle 2 and the wheel 1 is steered around an imaginary kingpin as described hereinafter.

Figure 3:
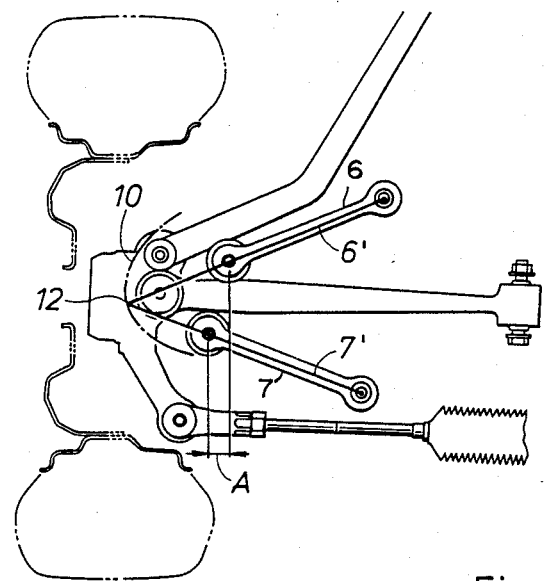
FIG. 3 is a skeleton diagram showing the geometrical relationship of the lower links.
Figure 4:
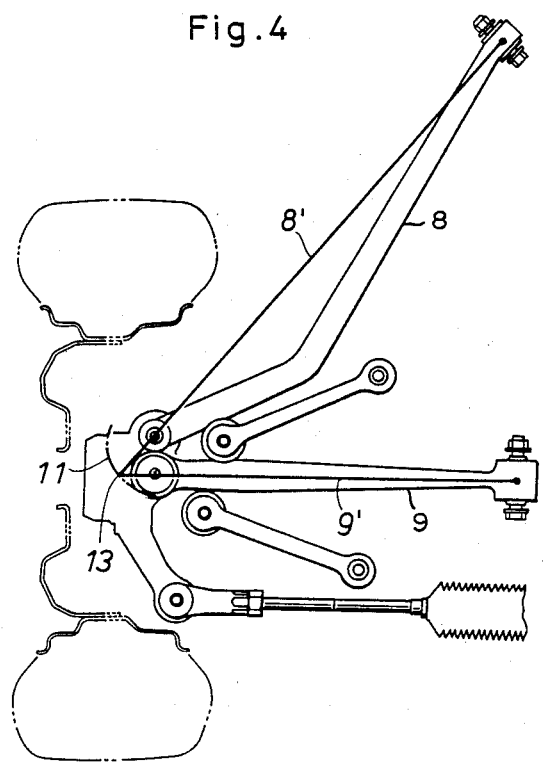
FIG. 4 is a skeleton diagram showing the geometrical relationship of the upper links.
Figure 5:
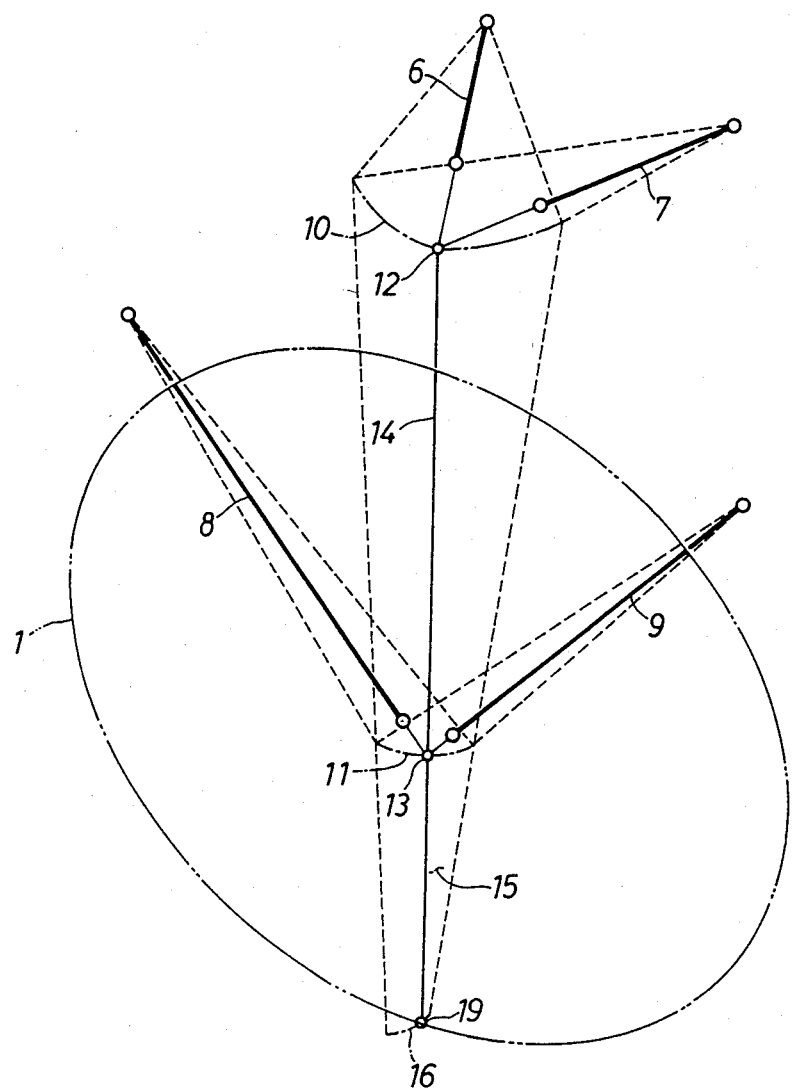
FIG. 5 is a skeleton diagram showing the trajectory surface of the imaginary kingpin.

When the links 6 and 7 are considered, as shown in FIG. 3, the instantaneous center of rotation 12 of an upper part of the knuckle 2 is given as a trajectory 10 of the intersection of the line extensions 6' and 7' of the links 6 and 7, respectively. When the links 8 and 9 are considered, as shown in FIG. 4, the instantaneous center of rotation 13 of a lower part of the knuckle 2 is given as a trajectory 11 of the intersection of the line extensions 8' and 9' of the links 8 and 9, respectively. Thus, the central axis of rotation of the knuckle 2 or the imaginary kingpin 14 is given by a line connecting these instantaneous centers of rotation 12 and 13 as illustrated in FIG. 5. As the steering angle changes, the imaginary kingpin 14 moves and defines a trajectory surface 15 which is given as a conical or a slightly twisted conical surface, the imaginary kingpin 14 giving the generatrix for this trajectory surface 15.

According to the present invention, the link 9 extends substantially in the same direction as the axle while the link 8 extends obliquely forwardly of the vehicle body as a radius rod. Therefore, when the wheel 1 is steered to the right in the sense of FIGS. 2 to 4, as shown in FIG. 4, the trajectory 10 of the instantaneous center of rotation 12 of the lower part of the knuckle 2 moves outwardly away from the vehicle body and then inwardly. However, when the wheel 1 is steered to the left in the sense of FIG. 2, the trajectory 10 of the instantaneous center of rotation 12 simply moves inwardly towards the vehicle body.

Further, the upper links 6 and 7 extend obliquely forwardly and rearwardly of the axle, respectively, so as not to interfere with the shock absorber system 22. However, since the pivot point 6a of the link 6 is located closer to the vehicle body than the pivot point 7a of the link 7 by a distance A (in the neutral position) as shown in FIG. 3, even though the layouts of the upper links and the lower links are substantially different from each other, the change in the instantaneous center of rotation 13 of the knuckle 2 determined by the upper links 6 and 7 is made similar to that by the lower links. In this particular embodiment, the inner ends of each pair of the upper and the lower lateral links 6 and 7, and 8 and 9 are located substantially at an equal distance from a longitudinal line of the vehicle and the outer ends of the lower lateral links 8 and 9 are likewise located substantially at an equal distance from a longitudinal line of the vehicle.

The present invention is not limited by the above described embodiment. It is also possible to have the link 8 acting as a radius rod extend obliquely rearwardly of the vehicle body so as to support the running resistance from the road surface as a compression force, instead of extending obliquely forwardly of the vehicle body. In this case, the change in the force required to maintain a certain steering angle can be controlled by placing the pivot point 6a of the link 6 further away from the vehicle body than the pivot point 7a of the link 7. Further, the lower end of the shock absorber system 22 may be connected directly to the knuckle 22 or an extension thereof instead of the lower lateral link 9.

According to the present invention, restrictions on the layout of the suspension system can be substantially eliminated and the change in the instantaneous center of rotation of the steerable wheel due to the change in the steering angle thereof can be favorably controlled. Thus, the present invention offers a significant advantage.

What we claim is:

1. A suspension system for a steerable wheel, comprising a knuckle rotatably supporting a wheel having a tire for rotation about an axle line, two pairs of lateral links, each pair being located one above the other, which are pivotally connected to upper and lower parts of the knuckle at their first ends, respectively, and pivotally connected to a vehicle body at their second ends, so as to allow both a steering action and a vertical motion of the knuckle, wherein:

the lower lateral links comprise a first lower link which extends substantially laterally of the vehicle substantially in parallel with the axle line of the wheel as projected onto the road surface and a second lower link which diverges relative to the first lower link from the knuckle toward the vehicle body forming a certain angle in relation with the first lower link;

the upper lateral links comprise a first upper link which extends in a direction intermediate between those of the lower links as projected onto a horizontal plane and a second upper link which diverges relative to the first upper link, so as to extend obliquely in opposite direction to the second lower link as projected onto a horizontal plane, from the knuckle toward the vehicle body forming a certain angle in relation with the first upper link; and the first end of the second upper lateral link being spaced laterally from the first end of the first upper lateral link away from the vehicle body while the first ends of the lower lateral links are substantially aligned along the longitudinal direction of the vehicle and, likewise, the second ends of each pair of the lateral links are substantially aligned to each other along a longitudinal direction of the vehicle.

2. A suspension system for a steerable wheel as defined in claim 1, wherein a lower end of a shock absorber system is connected to an intermediate point of the first lower lateral link while an upper end of the shock absorber system is passed through a space defined between the upper lateral links.

3. A suspension system for a steerable wheel as defined in claim 2, wherein the first lower lateral link is disposed behind the second lower lateral link.

4. A suspension system for a steerable wheel as defined in claim 3, wherein the suspension system is applied to a rear wheel of a four wheel steering vehicle.

5. A suspension system for a steerable wheel as defined in claim 1, wherein the second end of the first lower lateral link is pivotally connected to the vehicle body by way of a rubber mounted bush.

6. A suspension system for a steerable wheel as defined in claim 1, wherein the second end of the second lower lateral link is pivotally connected to the vehicle body by way of a rubber mounted bush.

7. A suspension system for a steerable wheel, comprising a knuckle rotatably supporting a wheel having a tire, two pairs of lateral links, each pair being located one above the other, which are pivotally connected to upper and lower parts of the knuckle at their first ends, respectively, and pivotally connected to a vehicle body at their second ends, so as to allow both a steering action and a vertical motion of the knuckle, wherein:

the lower lateral links comprise a first lower link which extends substantially laterally of the vehicle and a second lower link which diverges relative to the first lower link from the knuckle toward the vehicle body forming a certain angle in relation with the first lower link;

the upper lateral links comprise a first upper link which extends in a direction intermediate between those of the lower links as projected onto a horizontal plane and a second upper link which diverges relative to the first upper link, so as to extend obliquely in opposite direction to the second lower link as projected onto a horizontal plane, from the knuckle toward the vehicle body forming a certain angle in relation with the first upper link; and the first end of the second upper lateral link being spaced laterally from the first end of the first upper lateral link away from the vehicle body while the first ends of the lower lateral links are substantially aligned along the longitudinal direction of the vehicle and, likewise, the second ends of each pair of the lateral links are substantially aligned to each other along a longitudinal direction of the vehicle, wherein a lower end of a shock absorber system is connected to an intermediate point of the first lower lateral link while an upper end of the shock absorber system is passed through a space defined between the upper lateral links.

8. A suspension system for a steerable wheel as defined in claim 7, wherein the first lower lateral link is disposed behind the second lower lateral link.

9. A suspension system for a steerable wheel as defined in claim 8, wherein the suspension system is applied to a rear wheel of a four wheel steering vehicle.

* * * * *